(12) United States Patent
Dagle et al.

(10) Patent No.: US 7,758,846 B2
(45) Date of Patent: Jul. 20, 2010

(54) METHODS OF PRODUCING HYDROGEN VIA THE WATER-GAS SHIFT REACTION OVER A PD-ZN CATALYST

(75) Inventors: Robert A. Dagle, Richland, WA (US); Yong Wang, Richland, WA (US); Jianli Hu, Kennewick, WA (US)

(73) Assignee: Battelle Memorial Institute, Richland, WA (US)

( * ) Notice: Subject to any disclaimer, the term of this patent is extended or adjusted under 35 U.S.C. 154(b) by 1086 days.

(21) Appl. No.: 11/305,840

(22) Filed: Dec. 16, 2005

(65) Prior Publication Data
US 2007/0140956 A1 Jun. 21, 2007

(51) Int. Cl.
*C01B 3/18* (2006.01)
*C01B 3/26* (2006.01)
(52) U.S. Cl. .................. 423/656; 423/651
(58) Field of Classification Search .............. 423/656
See application file for complete search history.

(56) References Cited

U.S. PATENT DOCUMENTS

2002/0031471 A1* 3/2002 Tonkovich et al. ......... 423/652
2002/0114762 A1* 8/2002 Wang et al. ............... 423/656
2003/0157019 A1* 8/2003 Kushida et al. .......... 423/648.1
2004/0223908 A1* 11/2004 Holladay et al. ......... 423/648.1

FOREIGN PATENT DOCUMENTS

| FR | 2567866 A1 | 7/1984 |
|---|---|---|
| WO | 0226618 A2 | 4/2002 |
| WO | WO 03020410 A1 * | 3/2003 |

OTHER PUBLICATIONS

Wang, et al., XP-002444841, Journal of Catalysis, vol. 212, 2002, pp. 225-230.
PCT Written Opinion for PCT/US2006/047939.

* cited by examiner

*Primary Examiner*—Melvin C Mayes
*Assistant Examiner*—Kenneth Vaden
(74) *Attorney, Agent, or Firm*—Derek H. Maughan; Frank Rosenberg

(57) ABSTRACT

Methods for producing hydrogen via the water-gas shift reaction utilizing a palladium-zinc on alumina catalyst are described.

18 Claims, 3 Drawing Sheets

METHODS OF PRODUCING HYDROGEN VIA THE WATER-GAS SHIFT REACTION OVER A PD-ZN CATALYST

This invention was made with Government support under DARPA contract #DABT63-99-C-0039. The Government has certain rights in this invention.

FIELD OF THE INVENTION

The invention relates to catalysts, reactors and methods of producing hydrogen from the water gas shift reaction.

INTRODUCTION

Hydrogen gas ($H_2$) can be readily produced from synthesis gas (syngas) by steam reforming, or partial oxidation, or autothermal reforming of hydrocarbons. Additional $H_2$ is then produced by allowing syngas to react with steam according to the following exothermic water gas shift reaction (WGSR):

$$CO+H_2O=H_2+CO_2$$

The thermodynamics of WGSR are well known. The equilibrium constant of this reaction increases as temperature deceases. Hence, to increase the production of $H_2$, it is desirable to conduct the reaction at lower temperatures, which are also preferred from the standpoint of steam economy.

Two types of commercially available WGSR catalysts are: iron-based high temperature (HT) shift and copper-based low temperature (LT) shift catalysts with Cu based catalysts being relatively more active. However, both catalysts are not very active under their applicable conditions as indicated by their operational contact times (contact time is defined as catalyst bed volume divided by volumetric gas feed flowrate at standard temperature and pressure) of several seconds. Longer contact times imply the requirement of large catalyst bed volume. Operating at shorter contact times with these commercial catalysts requires higher reaction temperatures, which not only accelerates catalyst deactivation due to metal sintering but also disfavors the thermodynamics of the WGSR, as mentioned above.

Additionally, Fe and Cu are well known to be unsuitable for such fuel processing applications. Fe readily forms coke in excess fuel and is relatively inactive. Cu is irreversibly deactivated if exposed to $O_2$ and is also pyrophoric. Thus, there has been considerable interest in noble metal catalysts to overcome the problems associated with the conventional LT and HT WGS catalysts. However, there have been many problems reported for these noble metal based catalysts—usually Pt/Ce based. Particularly, they are found to be unstable in many circumstances—many believe this is due to the cerium promotion (which is necessary to achieve high activity).

As a replacement to the more conventional low-temperature water-gas-shift catalyst, CuZnAl-based, specifically for fuel processing applications, new shift catalysts have recently been under development. These new studies have included the development of precious metals such as Pd,Pt, and Rh on cerium as supports. These catalysts have the advantages to that of CuZnAl catalysts as mentioned above. While much development has been done with these precious metal catalysts, there still are issues with these catalysts related to stability. Researchers from Idatech and Catalytica[1] report that their Pt-based catalysts are shown to be initially very active under fuel processing conditions, but the stability is reported to be an issue. In particular, excess hydrogen in the feed is shown to lead to over reduction of ceria support which leads to deactivation of catalyst. Ceria is needed for the noble metal based catalysts for metal-support interactions. Therefore, it is concluded that this will be a problem for all noble metal-based WGS systems that require ceria in support. Gorte and his group believe that stability of Pt or Pd/Ceria based catalysts are unaffected by ceria structure but metal dispersion is the key[2,3]. Thus, Gorte et al believe promoters should stabilize this metal/ceria system and is the key to acceptable WGS fuel processing catalysts and has been working on this pursuit. Schmidt's group has done much research of the Pt/Ce-based catalysts for WGS[4]. Stability of these systems still appears to be a key issue for the successful implementation of these catalysts as a WGS in fuel processing applications. Despite these and other efforts made over many year, there remains a need for a selective, active and stable method for conducting the catalyzed Water Gas Shift reaction.

REFERENCES

1. "Are Noble Metal-Based WGS Catalysts Practical for Automotive Fuel Processing?", Journal of Catalysis 206 (2002).
2. "Deactivation Mechanisms for Pd/Ceria during the WGS Reaction", U of Penn, Gorte et. al. and Sud-Chemie, Journal of Catalysis 212 (2002).
3. "A comparative study of WGS reaction over ceria-supported metallic catalysts", U of Penn, Gorte et. al., Sud-Chemie, Applied Catalysis A 258 (2004)
4. "The WGS reaction at short contact times", Journal of Catalysis 223 (2004).

SUMMARY OF THE INVENTION

In one aspect, the invention provides a new method of producing hydrogen gas. In this method, a reactant gas mixture comprising carbon monoxide and water vapor is contacted with a Pd—Zn on alumina catalyst.

Another related aspect of the present invention is the use of the catalyst in a hydrogen production system. For example, the invention includes a fuel system (and methods of using the fuel system) containing the above-described reactor. In another aspect, the invention provides a hydrogen production system having a fuel source (preferably a liquid fuel tank); a primary conversion reactor (where a process such as steam reforming, partial oxidation, or autothermal reforming is conducted) to produce a gas mixture containing hydrogen, carbon dioxide, and carbon monoxide; and a water gas shift reactor. The water gas shift reactor includes a shift reactor inlet, a reaction chamber, and a shift reactor outlet. The shift reactor inlet is connected to the primary conversion reactor exhaust outlet such that carbon-monoxide-containing exhaust from the primary conversion reactor is fed into the shift reactor. The reaction chamber contains the catalyst described herein.

As is conventional patent terminology, the term "comprising" means "including." It should also be understood that, in more specific aspects of the invention, this term can be substituted with the terms "consisting essentially of" or "consisting of" to indicate increasingly specific aspects.

Various embodiments of the invention can provide numerous advantages including one or more of the following: high carbon monoxide conversions, high carbon dioxide selectivity, low methane selectivity, operation at short contact times, able to operate at higher temperatures than the CuZnAl catalyst—which enables a larger throughput due to the enhanced rate of reaction at high temperatures, non-pyrophoric nature of catalyst, and high stability over time even under relatively high temperatures.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

DETAILED DESCRIPTION OF THE INVENTION

Figure 1:
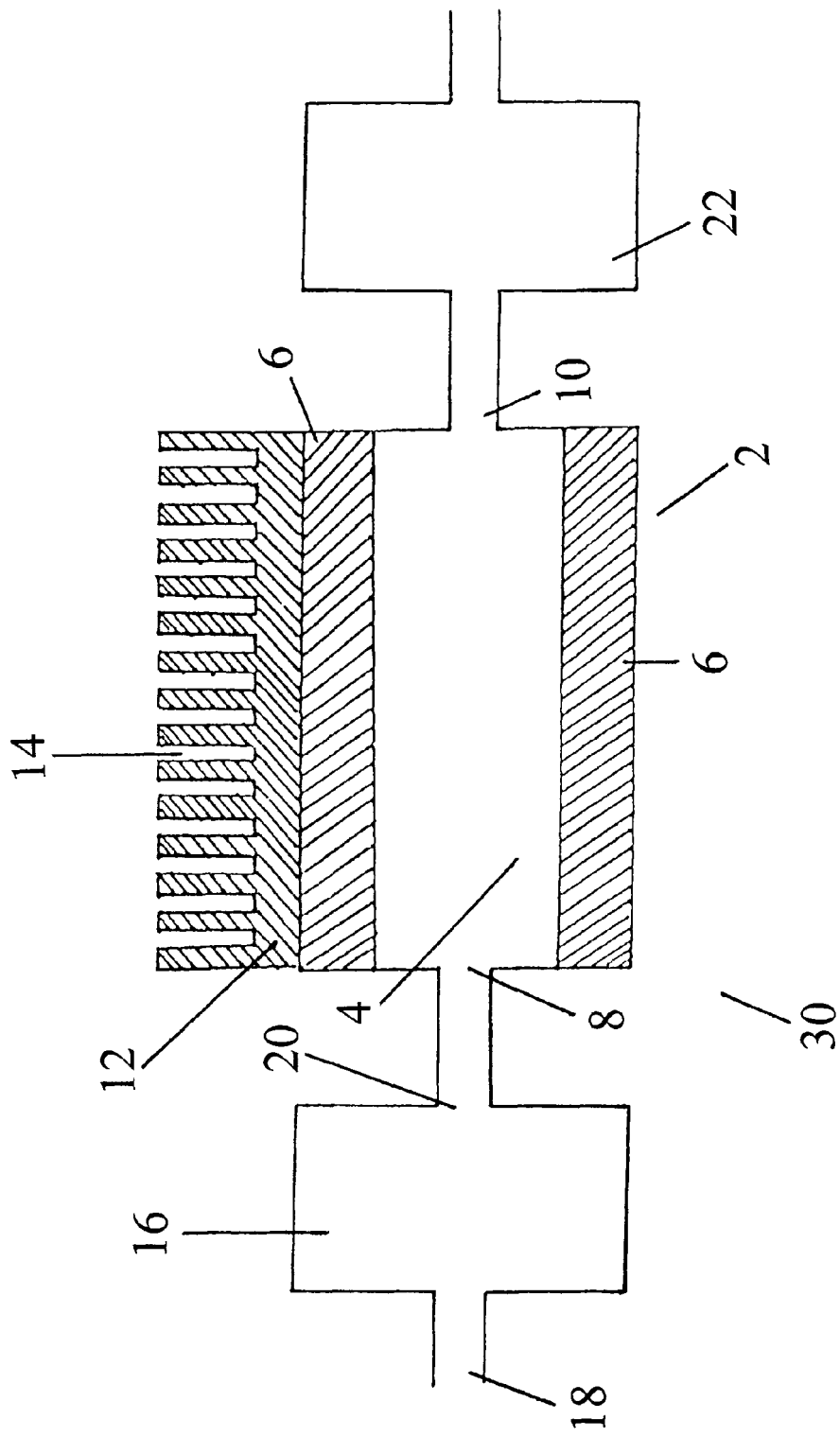
FIG. 1 is a schematic of a simplified fuel cell system that includes a cross-sectional view of a water gas shift reactor that includes a microchannel heat exchanger.

In catalysts of the present invention, a Pd—Zn alloy is dispersed on an alumina support. Alumina is a particularly desirable support because of its low cost, high surface area, and good interaction with Pd/Zn. In some preferred embodiments, the catalyst contains 2 to 10 weight % Pd (including the weight of the alumina, upon which the Pd/ZnO is dispersed, but not including any underlying material such as a metal felt or foam), and in some embodiments 5 to 10 wt %. In some preferred embodiments, the steam reforming catalyst has a Pd:Zn molar ratio of 0.1 to 0.6, more preferably 0.2 to 0.5, and still more preferably 0.25 to 0.40. In some preferred embodiments, a Pd/Zn catalyst is prepared by co-precipitating Pd and Zn; these components may be coprecipitated using inorganic or organometallic precursors. Prior to operation, the steam reforming catalyst may advantageously be subjected to an activation treatment, preferably reduction at 350-500° C. A Pd—Zn catalyst is superior to a Pd catalyst; in some embodiments, crystalline ZnO is present in the catalyst. A similar catalyst is described in published U.S. patent application 200400223908A1 for catalyzing alcohol steam reforming.

The catalyst may take any conventional form such as a powder or pellet. Additionally, in some preferred configurations, the catalyst includes an underlying large pore support. Examples of preferred large pore supports include commercially available metal foams and, more preferably, metal felts. Prior to depositing the Pd—Zn on alumina catalyst, the large pore support has a porosity of at least 5%, more preferably 30 to 99%, and still more preferably 70 to 98%. Preferably, the support has an average pore size (sum of pore diameters/number of pores) of from 1 µm to 1000 µm as measured by optical and scanning electron microscopy. Preferred forms of porous supports are foams and felts. Foams are continuous structures with continuous walls defining pores throughout the structure. Felts are fibers with interstitial spaces between fibers and includes tangled strands like steel wool. Another support can be a monolith, such as a honeycomb. Also, the catalyst can be dispersed on the walls of a channel or array of microchannels (channels having a dimension of 5 mm or less) in a microreactor. Various supports and support configurations are described in U.S. Pat. No. 6,680,044, which is incorporated by reference. U.S. Pat. No. 6,488,838 (filed Aug. 17, 1999) is also incorporated herein.

A catalyst including a large pore support preferably has a pore volume of 5 to 98%, more preferably 30 to 95% of the total porous material's volume. Preferably, at least 20% (more preferably at least 50%) of the material's pore volume is composed of pores in the size (diameter) range of 0.1 to 300 microns, more preferably 0.3 to 200 microns, and still more preferably 1 to 100 microns. Pore volume and pore size distribution are measured by mercury porisimetry (assuming cylindrical geometry of the pores) and nitrogen adsorption. As is known, mercury porisimetry and nitrogen adsorption are complementary techniques with mercury porisimetry being more accurate for measuring large pore sizes (larger than 30 nm) and nitrogen adsorption more accurate for small pores (less than 50 nm). Pore sizes in the range of about 0.1 to 300 microns enable molecules to diffuse molecularly through the materials under most gas phase catalysis conditions.

Certain aspects of the catalyst may be best characterized with reference to measurable properties of the water gas shift reaction. In some preferred embodiments, when the catalyst is tested by placement in a reaction chamber (as described in the examples) and contacted with a reactant gas mixture containing 8% CO, 7% $CO_2$, 38% $H_2$, and 47% $H_2O$, at a contact time of 80 ms and a temperature of 300° C., it results in greater than 70% (and in some preferred embodiments 70 to 85%) CO conversion and at least 80% (and in some preferred embodiments 80 to 95%) $CO_2$ selectivity.

In the inventive method of producing hydrogen gas, a reactant gas mixture comprising carbon monoxide and water vapor is contacted with the catalyst. In typical applications, such as in a portable fuel processing system, the gas mixture will also contain carbon dioxide, hydrogen, and/or inert gases such as nitrogen. In certain preferred embodiments, the gas mixture comprises, in mole % (which is equivalent to partial pressures) 1 to 15% CO, 1 up to 70% $H_2O$, 1 to 15% $CO_2$, and up to 75% $H_2$, more preferably, 3 to 20% CO, 3 to 60% $H_2O$, 3 to 20% $CO_2$, and 10 to 60% $H_2$. It may be desired to conduct the water gas shift reaction under conditions that minimize the methanation reaction. The water-gas-shift catalyst is typically contained in a reaction chamber. High temperature favors reaction rate, but disfavors equilibrium CO conversion. In some embodiments, the temperature at the catalyst during the reaction is less than 450° C., in some embodiments in the range of 200 to 420° C., and in some embodiments in the range of 250 to 350° C. to maximize equilibrium CO conversion. The inventive catalyst can be advantageously employed at higher temperatures; in some embodiments at temperatures above 300° C., in some embodiments in the range of 325° C. to 375° C. Shorter contact times (defined as the total volume of catalyst-containing reaction chambers divided by the total volume of reactant gases corrected to 273K and 1 atm, and assuming ideal gas behavior) are preferred to minimize reactor volume, preferably less than 1 s, more preferably less than 100 ms; in some embodiments in the range of 3 to 100 ms. Conversion of carbon monoxide (defined as CO mole change between reactant and product divided by moles CO in reactant), typically measured in conjunction with the above-described ranges, is preferably at least 70%; and in some preferred embodiments conversion is in the range of 50 to 85%. Selectivity to carbon dioxide (defined as moles $CO_2$ produced divided by moles $CO_2$ produced plus moles $CH_4$ produced), typically measured in conjunction with the above-described ranges and CO conversions, is preferably at least 70%; and in some preferred embodiments $CO_2$ selectivity is in the range of 80 to 100%.

As discussed in published U.S. patent application 200400223908A1, the catalyst can be made by a process that includes the steps of: providing an alumina support; adding a solution comprising dissolved zinc to the solid metal oxide support; adding a base to increase pH; and subsequent to at least a portion of the step of adding a base, depositing Pd. The alumina support could itself be deposited (either before or after the other steps) onto a large pore support. This method is especially advantageous in aqueous solutions where the metal oxide support would normally have an acidic surface. The dissolved Zn is at least partially, and more preferably completely, dissolved in a solvent. The solution containing dissolved zinc contains at least zinc, but may also contain other components including metals; in some preferred embodiments there are no other metals in the zinc solution; in some preferred embodiments the solution is 0.1 to 3 M zinc. The order of addition, alumina to Zn solution or Zn solution to alumina is not critical and the inventive method includes either order. The base can be added before, during, or after the zinc solution is added. Preferably, the base is added after the zinc solution, more preferably it is added to slowly to result in gradual precipitation of zinc. Preferably, the base is an aqueous ammonia solution. In some preferred embodiments, base is added until a pH of 7 or greater is obtained. Improvement is obtained where Pd is added after at least a portion of the base is added. Preferably, Pd is added after all the base has been added—this results in the greatest percentage of Pd being disposed on the catalyst surface. Pd is preferably deposited on the catalyst after deposition of the zinc, and, in some preferred embodiments, after the zinc-containing layer has been dried and, optionally, calcined. In some preferred embodiments, Pd is impregnated onto the Zn-containing support in solution, preferably aqueous solution.

Alternatively, the catalyst can be made by the incipient wetness impregnation technique by impregnating alumina with a solution of Pd and Zn. The resulting material is then dried and calcined, preferably in the range of 350 to 450° C.

The catalyst should be reduced to form a Pd—Zn alloy. In some preferred embodiments, the catalyst is reduced in the presence of $H_2$ at a temperature of at least 350° C., in some embodiments above 400° C., and in some embodiments in the range of 400 to 500° C. In some preferred embodiments, the catalyst is prepared and reduced under hydrogen with temperatures never exceeding 400° C. preferably, calcining of the Zn-containing catalyst, either before and/or after depositing Pd, is conducted at 200 to 400° C., more preferably 250 to 350° C. Similar temperature ranges can be used when reducing (and operating) the catalyst. The low temperature treatment increases catalyst life and surface area.

The invention also includes catalysts made by the foregoing methods.

One embodiment of a reactor 2 is shown in cross-section in FIG. 1. The reaction chamber 4 contains catalyst 6 and has an inlet 8 and outlet 10. In FIG. 1, the catalyst is shown on the top and bottom of the reaction chamber with an open channel from the reactor inlet to the outlet—this configuration is called "flow-by." Other configurations, such as "flow-through" where flow is directed through a porous catalyst, are, of course, possible. To improve heat transfer, a microchannel heat exchanger 12 can be placed in contact with the reaction chamber. The microchannel heat exchanger 12 has channels 14 for passage of a heat exchange fluid. These channels 14 preferably have at least one dimension that is less than 5 mm. The distance from the channels 14 to catalyst 6 is preferably minimized in order to reduce the heat transport distance. Microchannel heat exchangers can be made by known techniques such as electrodischarge machining (EDM).

Figure 2:
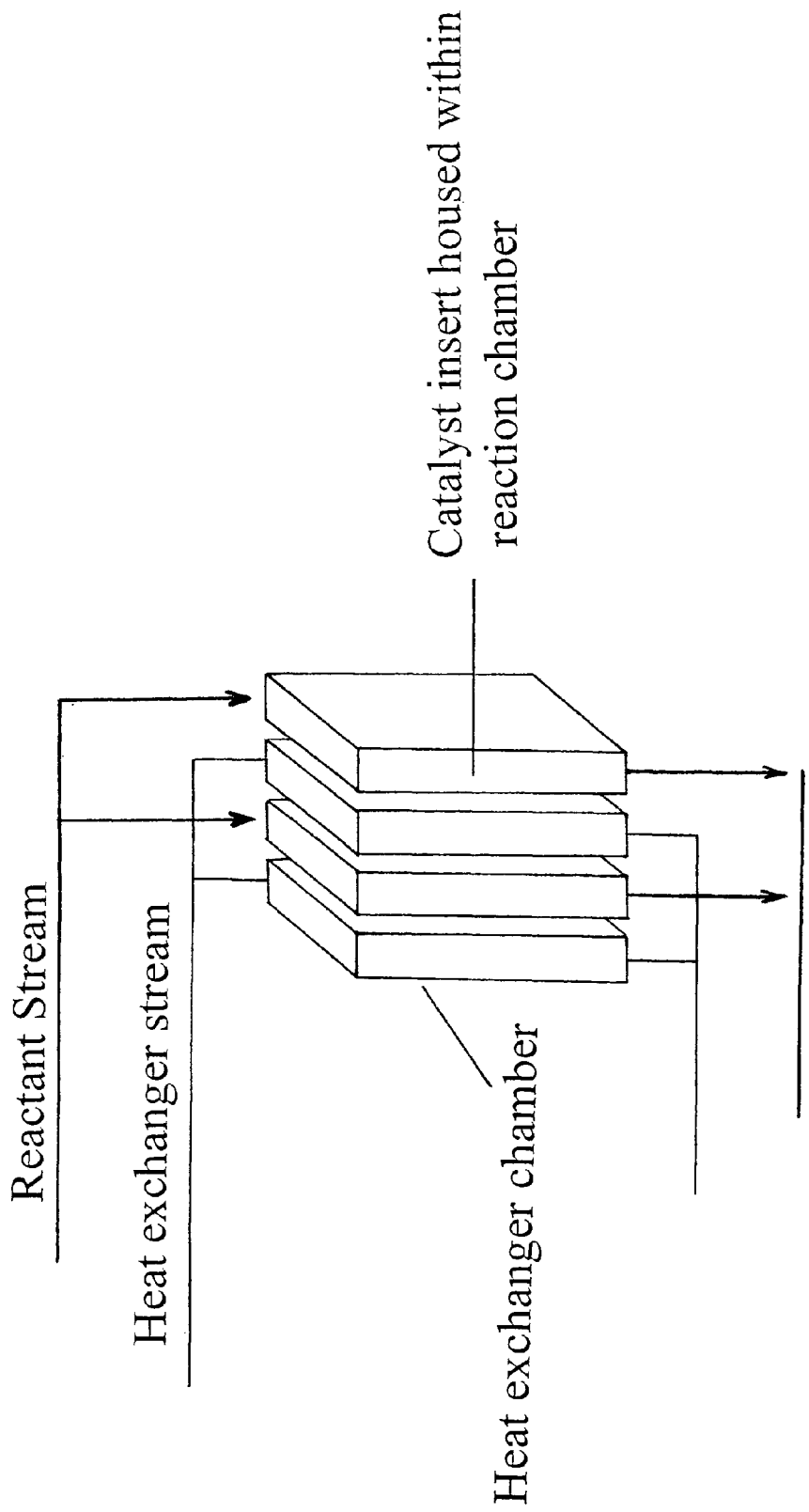
FIG. 2 is a schematic view of an interleaved microchannel reactor oriented in a co-current flow configuration.

The preferred reaction chamber for the water gas shift reaction may be of any length or height. The preferred reaction chamber width is 5 mm or less, more preferably 2 mm or less, and in some embodiments, the reaction chamber width is 1 mm or less. The reaction chamber is preferably in thermal contact with a heat exchange chamber to remove the exothermic reaction heat from the WGSR. The heat exchange chamber in thermal contact with the reaction chamber may also be of any length or height. Preferably the length and height of the heat exchange chamber is close to the dimensions of the reaction chamber. Most preferably the heat exchange chamber is adjacent to the reaction chamber in an interleaved chamber orientation (see FIG. 2—width is the direction in which the interleaved reaction chambers and heat exchange chambers stack) in which there are at least three reaction channels (in this embodiment, the terms channels and chambers are used interchangeably) interleaved with at least three heat exchange channels. The width of the heat exchanger chamber preferably is 5 mm or less, more preferably 2 mm or less, and in some embodiments, the heat exchange chamber width is 1 mm or less. The direction of flow in the heat exchange chamber may be either co-current, counter-current, or cross-flow. The short distances for mass and heat transfer in a microchannel apparatus will enable excellent performance.

The WGS reactor may also be configured by placing the reaction chamber adjacent to a heat exchanger chamber that is comprised of an array of microchannels rather than a single microchannel. In this configuration the width of the reaction chamber may exceed 5 mm, but at least one dimension of a single microchannel in the array is preferably less than 5 mm. Preferably this dimension is less than 2 mm. The desired width of the reaction chamber can be a strong function of the effective thermal conductivity of the catalyst. The higher the effective thermal conductivity of the catalyst, the wider can be the catalyst and still enable rapid heat removal. There are by now numerous microchannel reactor designs known in the literature, and the skilled worker can select an appropriate design for conducting the WGS reaction in microchannel apparatus.

The WGS reaction can occur in a single step or in multiple steps. In one embodiment, the method has a first step of a relatively high temperature WGS reaction over a Pd—Zn catalyst followed by a second, lower temperature step over a conventional WGS catalyst such as a Cu-based catalyst. The temperature difference (based on average temperature of each step) could be at least 20° C. (or at least 40° C.). This multi-step reaction could be conducted in separate reactors or in a single reactor having multiple zones, such as a first relatively hot WGS reaction zone followed by a cooler WGS reaction zone.

In one preferred embodiment, a reaction chamber 4 is connected to the outlet of a primary conversion reactor 16 such that exhaust from the primary conversion reactor flows into the reaction chamber. Thus, in a typical configuration, fuel and an oxidizer flow through inlet 18 into the primary conversion reactor 16 where the fuel is converted to CO, $H_2O$ and $CO_2$. The primary conversion gases flow out through exhaust port (outlet) 20 and into the reaction chamber where CO and $H_2O$ are converted to $H_2$ and $CO_2$. The product gases (including $H_2$) then may either flow into fuel cell 22 where the $H_2$ is combined with $O_2$ to generate electricity, or the product of the WGSR flows into a secondary clean up process to remove residual levels of carbon monoxide. The secondary clean-up process may include a preferential oxidation reactor, membrane separation of either hydrogen or carbon monoxide, a sorption based separation system for either hydrogen or carbon monoxide, and the like. These elements form a highly simplified fuel processing system 30. In practice, fuel processing systems will be significantly more complex. Typically, heat from the combustor will be used to generate heat for other processes such as generating steam (not shown) that can be utilized for a steam reformer, autothermal reactor and water gas shift reactor. Water-gas shift reactors can operate in series. Usually, hydrogen gas from the shift reactor(s) will be purified before it flows into the fuel cell. Various fuel cells are well-known and commercially available and need not be described here. Instead of fuel cell 22, the hydrogen-containing gas could go to: a storage tank, a refueling station, a hydrocracker, hydrotreater, or to additional hydrogen purifiers.

This description is not intended to limit the invention. Feed into a WGS reactor may come from a variety of sources, for example, from a steam reforming reaction, autothermal reforming, from a partial oxidation reaction, etc. The feed may come directly into the WGS reactor, or may first be modified or subjected to a separation step prior to entry into the WGS reactor. The various reactions could be conducted in separate reactors or in a single, integrated reactor.

EXAMPLES

The following examples are descriptions based on typical conditions used to make numerous samples. Certain temperatures, etc. set forth preferred values for conducting various steps.

$Al_2O_3$ supported Pd—ZnO catalysts were prepared using a one-step co-impregnation method. Specifically, a concentrated palladium nitrate solution (20.19 wt % Pd, Engelhard Corp.) was mixed with $Zn(NO_3)_2 \cdot 6H_2O$ (99.5%, Aldrich) at 60° C. A neutral $\gamma$-$Al_2O_3$ support (Engelhard Corp.) with a BET surface area of 230 $m^2$/g, and 70-100 mesh particle size, was pre-calcined at 500° C. for 2 hrs and kept at 110° C. prior to the incipient-wetness impregnation step. The support was impregnated at 60° C. with appropriate amount of the pre-mixed Pd and Zn nitrate solution to obtain the final products with various Pd loadings (in this case 8.9%) and Pd/Zn molar ratios (in this case 0.38). The wet sample was kept at 60° C. for 1 hour before drying in air at 110° C. overnight. The dried sample was then calcined at 350° C. for 3 hours. For comparison purposes, commercial Sud-Chemie and ICI Katalco low temperature-shift (LST) CuZnAl catalysts and Nex Tech precious metal based catalysts were also studied, all with the same particle size range of 70-100 mesh.

Figure 3:
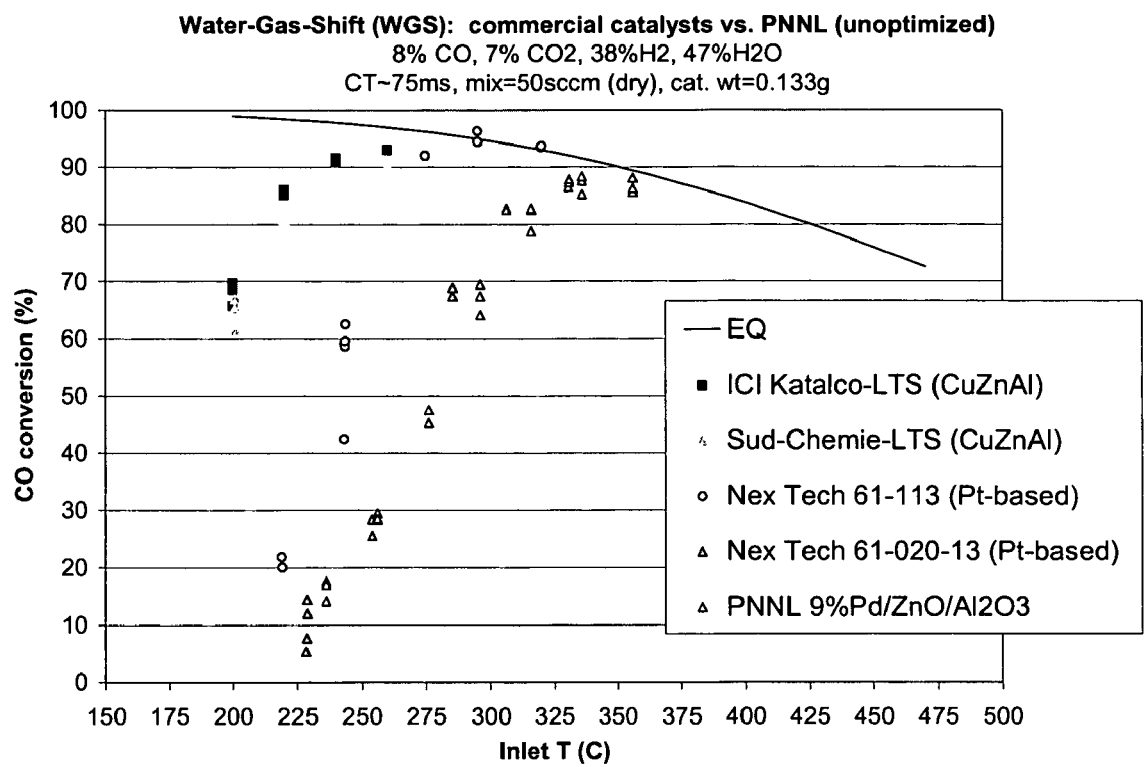
FIG. 3 shows the results of Water-Gas-Shift (WGS) reaction testing for a Pd/Zn/Al2O3 catalyst compared to commercial Shift catalysts.

Water-gas shift reaction catalyst testing was conducted in a 4 mm i.d. fixed-bed quartz tubular reactor at ambient pressure. Two K-type thermal couples were installed in the reactor in an opposite directions for the measurement of temperatures of the inlet and catalyst bed, respectively. About 0.133 g of catalyst was packed in the reactor and the catalyst was reduced using 10% hydrogen/Ar gas mixture at 400° C. for 3 hours prior to the test. A pre-mixed gas containing hydrogen, carbon monoxide and carbon dioxide was introduced, using a Brooks Mass Flow Controller (5850E series), into a microchannel vaporizer where water was introduced using a syringe pump (Cole Parmer 74900 series). In the micro-channel vaporizer, the water was vaporized at 200° C. and mixed with the pre-mix before being introduced to the reactor. The wet feed composition comprised of 8% CO, 7% $CO_2$, 38% $H_2$, and 47% $H_2O$. A moisture condenser and dry-rite bed were used to remove liquid materials from the products. The gaseous effluent was analyzed using a MTI GC (Model Q30L) equipped with MS-5A and PPQ columns and a thermal conductivity detector (TCD). Results are shown in FIG. 3.

The catalyst tested in this example was not optimized for this reaction, and, based on the present results, it can be expected that optimization will lead to improved results. Surprisingly, the un-optimized PdZnAl catalyst has comparable activities to the Pt-based commercial catalyst. The CuZnAl catalyst exhibited higher activities. Again, advantages of the PdZnAl catalyst for WGS, include the ability to run at higher temperatures, and thus achieve higher throughput due to enhanced rate of reaction. Additionally, the PdZnAl catalyst has already been shown to be stable under fuel processing conditions—for methanol steam reforming (similar temperatures as WGS)—and has demonstrated stable operation for hundreds of hours.

CLOSURE

While preferred embodiments of the present invention have been shown and described, it will be apparent to those skilled in the art that many changes and modifications may be made without departing from the invention in its broader aspects. The appended claims are therefore intended to include all such changes and modifications as fall within the true spirit and scope of the invention.

We claim:

1. A method of producing hydrogen gas via the water-gas shift reaction comprising:
   flowing a reactant gas mixture into contact with a catalyst;
   wherein the reactant gas mixture comprises 1 to 15 mole % CO, 1 to 70 mole % $H_2O$, 3 to 15 mole % $CO_2$, and up to 75 mole % $H_2$;
   wherein the catalyst comprises Pd and Zn dispersed on alumina and having a Pd:Zn molar ratio of 0.1 to 0.6; and
   forming hydrogen gas.

2. A method of producing hydrogen gas via the water-gas shift reaction comprising:
   flowing a reactant gas mixture into contact with a catalyst;
   wherein the reactant gas mixture comprises 3 to 20 mole % CO, 3 to 60 mole % $H_2O$, 3 to 20 mole % $CO_2$, and 10 to 60 mole % $H_2$;
   wherein the catalyst comprises Pd and Zn dispersed on alumina and having a Pd:Zn molar ratio of 0.1 to 0.6; and
   forming hydrogen gas.

3. The method of claim 2 wherein the catalyst is at a temperature of 200° C. to 420° C.

4. The method of claim 1 wherein the catalyst comprises a large pore support and the catalyst is at a temperature of 240° C. to 350° C.

5. The method of claim 3 wherein said step of flowing is controlled so that the contact time is in the range of 3 to 100 milliseconds.

6. The method of claim 1 where selectivity to carbon dioxide is at least 70% and conversion of CO is at least 70%.

7. The method of claim 1 wherein said step of flowing is controlled so that the contact time is less than 1 second.

8. The method of claim 5 wherein the catalyst is disposed in a reaction channel having a width of 5 mm or less.

9. The method of claim 8 wherein the catalyst is disposed on microchannel walls in an array of microchannels in a microreactor.

10. The method of claim 8 wherein the catalyst comprises a honeycomb support.

11. The method of claim 1 wherein crystalline ZnO is present in the catalyst.

12. The method of claim 7 wherein carbon monoxide conversion is at least 70%.

13. The method of claim 12 wherein the catalyst has a Pd:Zn molar ratio of 0.2 to 0.5.

14. The method of claim 12 wherein said step of flowing is controlled so that the contact time is in the range of 3 to 100 milliseconds.

15. The method of claim 1 wherein the catalyst is at a temperature of 325° C. to 375° C.

16. The method of claim 12 wherein selectivity to carbon dioxide is in the range of 80 to 100%.

17. The method of claim 1 wherein the catalyst is disposed in a reaction channel having a width of 2 mm or less.

18. The method of claim 1 wherein the catalyst is at a temperature of 250° C. to 350° C.

* * * * *